(12) United States Patent
Ger (10) Patent No.: US 10,399,447 B2
(45) Date of Patent: Sep. 3, 2019

(54) CONTROL METHOD OF SWAPPABLE BATTERY PACK SET APPLIED TO ELECTRIC VEHICLE (71) Applicant: Chih-Chan Ger, New Taipei (TW)

(72) Inventor: Chih-Chan Ger, New Taipei (TW)

(*) Notice: Subject to any disclaimer, the term of this patent is extended or adjusted under 35 U.S.C. 154(b) by 41 days.

(21) Appl. No.: 15/542,698

(22) PCT Filed: Jan. 8, 2016

(86) PCT No.: PCT/CN2016/070452
§ 371 (c)(1),
(2) Date: Jul. 11, 2017

(87) PCT Pub. No.: WO2016/112827
PCT Pub. Date: Jul. 21, 2016

(65) Prior Publication Data
US 2017/0355274 A1 Dec. 14, 2017

(30) Foreign Application Priority Data
Jan. 13, 2015 (CN) .......................... 2015 1 0015428

(51) Int. Cl.
B60L 11/18 (2006.01)
B60L 50/15 (2019.01)
(Continued)

(52) U.S. Cl.
CPC .......... B60L 11/1822 (2013.01); B60L 50/15 (2019.02); B60L 50/64 (2019.02); B60L 53/80 (2019.02);
(Continued)

(58) Field of Classification Search
CPC .. B60L 11/12; B60L 11/1822; B60L 11/1879; B60L 50/15; B60L 50/64;
(Continued)

(56) References Cited

U.S. PATENT DOCUMENTS 5,349,535 A * 9/1994 Gupta ................. B60L 11/1818
320/106
2013/0054080 A1* 2/2013 Jacobson ........... G07C 9/00039
701/29.3
(Continued)

FOREIGN PATENT DOCUMENTS

CN 1433906 A 8/2003
CN 1435339 A 8/2003
(Continued)

OTHER PUBLICATIONS

International Search Report and Written Opinion for PCT/CN2016/070452 dated Apr. 1, 2016.

Primary Examiner — Vuthe Siek
(74) Attorney, Agent, or Firm — McClure, Qualey, & Rodack, LLP (57) ABSTRACT A control method for a swappable battery pack set of electric vehicles (EVs), wherein each of the EVs has a main battery pack set and at least a swappable battery pack set simultaneously. The control method includes the following process of uninstalling the swappable battery pack set from a first EV, before charging the swappable battery pack set; executing a charge unlocking process, before charging the swappable battery pack set; executing a charge locking process, after charging the swappable battery pack set; and installing the swappable battery pack set to a second EV after executing the charge locking process.

11 Claims, 7 Drawing Sheets (51) Int. Cl.
*B60L 53/80* (2019.01)
*B60L 50/64* (2019.01)
(52) U.S. Cl.
CPC .......... *Y02T 10/7005* (2013.01); *Y02T 10/705* (2013.01); *Y02T 10/7072* (2013.01); *Y02T 10/7077* (2013.01); *Y02T 90/124* (2013.01); *Y02T 90/14* (2013.01)
(58) Field of Classification Search
CPC .. B60L 53/80; Y02T 10/7005; Y02T 10/7077; Y02T 10/705; Y02T 10/7072; Y02T 90/124; Y02T 90/14; B06L 11/18; B06L 11/12
See application file for complete search history.

(56) References Cited

U.S. PATENT DOCUMENTS

2014/0285146 A1* 9/2014 Huston ............... B60L 11/1816
320/109
2016/0372763 A1* 12/2016 Lu ..................... H01M 8/04007

FOREIGN PATENT DOCUMENTS

| CN | 102529733 A | 7/2012 |
| GB | 2353151 A | 2/2001 |

\* cited by examiner

CONTROL METHOD OF SWAPPABLE BATTERY PACK SET APPLIED TO ELECTRIC VEHICLE

BACKGROUND OF THE INVENTION

Field of the Invention

This invention is regarding a control method. More precisely speaking, this invention is regarding a control method of a swappable battery pack set applied to an electric vehicle.

Descriptions of the Related Art

With the rise of environmental consciousness and energy-saving awareness, automobile companies have been committed to develop technologies for reducing energy consumption and waste emission. There are numerous studies on hybrid electric vehicles (HEV) and electric vehicles (EV) that feature energy-saving and carbon-reduction According to an investigation of Japan Automobile Research Institute (JARI), FC.EV Center, on average, a gasoline-powered automobile consumes energy three times more than an EV does, and its CO2 emission (per kilometer traveled) is 4 times of that (power conversion) of an EV. As a result, some automobile companies, such as Nissan, BMW, BYD and Tesla, are developing EVs for the automobile market. Although with limited market share, EVs are attracting increasing attentions.

The main problem of EVs is the power capacity. An EV has at least one battery pack set for operation, and when the battery is exhausted, it needs to be recharged. To fully charge an exhausted battery for EV, it requires about 30 minutes, which is time-consuming and inconvenient for most drivers.

The concept of "battery swap" has been proposed recently, by which the drivers replace the exhausted battery pack set with a fully charged battery pack set. The problems of battery swapping are as follows: 1) the main battery pack set is large and heavy, thus it is difficult to be replaced; 2) the main battery pack sets produced by different manufacturers vary in appearance and capacity, so that the charging stations have to prepare excessive main battery pack sets for different brands and models, which is a huge burden.

In order to solve the above-mention problem, other solutions have been proposed, such as using an additional swappable battery pack set to replace the main battery pack set or synergize with it in powering the EV. Using swappable battery pack sets of unified specifications, small size and low costs to charge the main battery pack sets or synergize with them in powering the EV can effectively improve the economic benefits of charging stations.

Although the cost of swappable battery pack sets is cheaper than the main battery pack set, it still costs over 10,000 NTD. Thus, it is not economical for users to buy the swappable batteries on their own. A preferred mode is to rent swappable batteries from charging stations to increase the battery capacity for EVs in long-distance travel. The service life of a battery is closely related with its method of use. Factors like charging current, rate of discharge and recharge cycles may all influence its life greatly.

Service life of battery pack sets owned by charging stations may be shortened if charged (e.g. with heavy current) or discharged unlimitedly when rented out. Therefore, one important issue is how to limit the recharge cycle of battery pack sets to extend their service life.

SUMMARY OF THE INVENTION

In view of the foregoing, the present invention is to provide a control method for limiting the charge-discharge functions of EV swappable battery pack sets and enable their usage in appropriate charging environment.

To achieve the above, a control method for a swappable battery pack set of electric vehicles (EVs), wherein each of the EVs has a main battery pack set and at least a swappable battery pack set simultaneously. The control method comprises the following process of uninstalling the swappable battery pack set from a first EV, before charging the swappable battery pack set; executing a charge unlocking process, before charging the swappable battery pack set; executing a charge locking process, after charging the swappable battery pack set; and installing the swappable battery pack set to a second EV after executing the charge locking process.

In one of the embodiments, the control method of the swappable battery pack set includes uninstalling the swappable battery pack set from a first EV before charging the pack set and installing it to a second EV after the charge locking process.

In one of the embodiments, the swappable battery pack set runs the charge locking or charge unlocking process through software verification, hardware verification or software-hardware verification.

In one of the embodiments, a using restricting condition is set before the swappable battery pack is installed on a second EV. According to the restricting condition, the swappable battery pack set is charged and discharged through a switched-mode DC-to-DC power converter installed within.

In one of the embodiments, the using restricting conditions comprise one restricting condition for charging time, one for charging power and one for charging count.

In one of the embodiments, the using restricting condition comprises a "charger off" command. In other words, the swappable battery pack set cannot be charged after executing the charge locking process.

In one of the embodiments, charging of the swappable battery pack set before the charge unlocking Process comprises a feedback unit that transmits a feedback signal to a control unit; the control unit compares the feedback signal to the using restricting condition; when the feedback signal satisfies the using restricting condition, an interrupt signal generated by the control unit and transmitted to the switched-mode DC-to-DC power converter.

In one of the embodiments, when the swappable battery pack set is charged before the charge unlocking Process, the control method comprises a clock unit transmitting a clock signal to a control unit; the control unit compares the clock signal to the using restricting condition; when the clock signal satisfies the using restricting condition, an interrupt signal is generated by the control unit and transmitted to the switched-mode DC-to-DC power converter.

After the swappable battery pack set is installed on the EV, the using restricting condition is transmitted to the EV; power is generated by the swappable battery pack set according to the using restricting condition, and transmitted to the EV through the switched-mode DC-to-DC power converter of the swappable battery pack set.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, this invention will be explained with reference to embodiments thereof. However, the description of these embodiments is only for purposes of illustration rather than limitation. It should be appreciated that in the following embodiments and attached drawings, elements unrelated to this invention are omitted from depictions; and dimensional relationships among individual elements in the attached drawings are illustrated only for ease of understanding, but not to limit the actual scale.

The present invention provides a control method for charge/discharge of swappable battery pack sets of EVs, in order to extend the service life of swappable battery pack sets used in EVs for better economic benefits. EVs include electric automobiles, electric motorcycles and other electric means of transportation, such as plug-in battery vehicles (PBEV).

Figure 1:
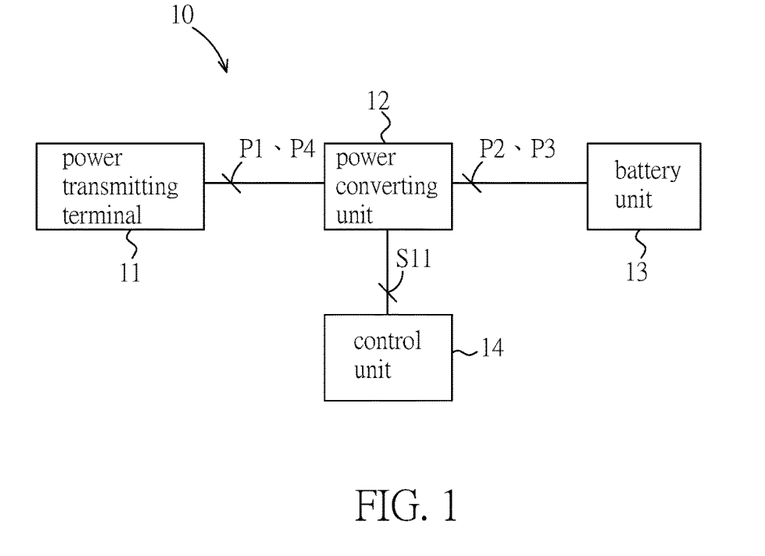
FIG. 1 is a schematic diagram of the first embodiment of a swappable battery pack set applied to an EV of the present invention.

Referring to FIG. 1, a structure diagram of the first embodiment of the present invention applied in an EV swappable battery pack set 10. The swappable battery pack set 10 comprises at least a power transmitting terminal 11, a switched-mode DC-to-DC power converter 12, a battery unit 13 and a control unit 14. The switched-mode DC-to-DC power converter 12 is electrically connected to the power transmitting terminal 11, the battery unit 13 and the control unit 14, respectively. It should be noted that, the EV in this embodiment can mount a main battery pack set and at least a swappable battery pack set 10 at the same time, and the size of the swappable battery pack set is smaller than that of the main battery pack set.

The power transmitting terminal 11 is a connecting terminal that is electrically connected to an external connecting terminal. The power transmitting terminal 11 can receive a first power P1 from the external connecting terminal, and can transmit a fourth power P4 to the external connecting terminal.

The switched-mode DC-to-DC power converter 12 is a direct-current (DC) converter, which is electrically connected to the power transmitting terminal 11, the battery unit 13 and the control unit 14, respectively. The switched-mode DC-to-DC power converter 12 mainly receives the first power P1, converts it into second power P2, and re-transmits it to the battery unit 13 for storage. Moreover, the switched-mode DC-to-DC power converter 12 can receive third power P3 outputted by the battery unit 13, convert it into fourth power P4, and re-transmit it to the power transmitting terminal 11. In other words, the switched-mode DC-to-DC power converter 12 is a switched-mode DC-to-DC power converter in unidirectional or bidirectional mode.

The battery unit 13 has a plurality of secondary batteries, such as nickel metal hydride batteries or lithium-ion batteries; lithium-ion batteries may include LiFePo4 batteries or LTO batteries. Compared to lithium-ion batteries, the LiFePo4 batteries have higher output power, faster charging rate, and good stability and safety features, while the LTO batteries have greater output power, faster charging rate, better safety feature, and long service life.

The control unit 14 outputs a switching control signal S11 to control the switched-mode DC-to-DC power converter 12. In this embodiment, the switching control unit S11 is a pulse-width modulation (PWM) signal.

Figure 2:
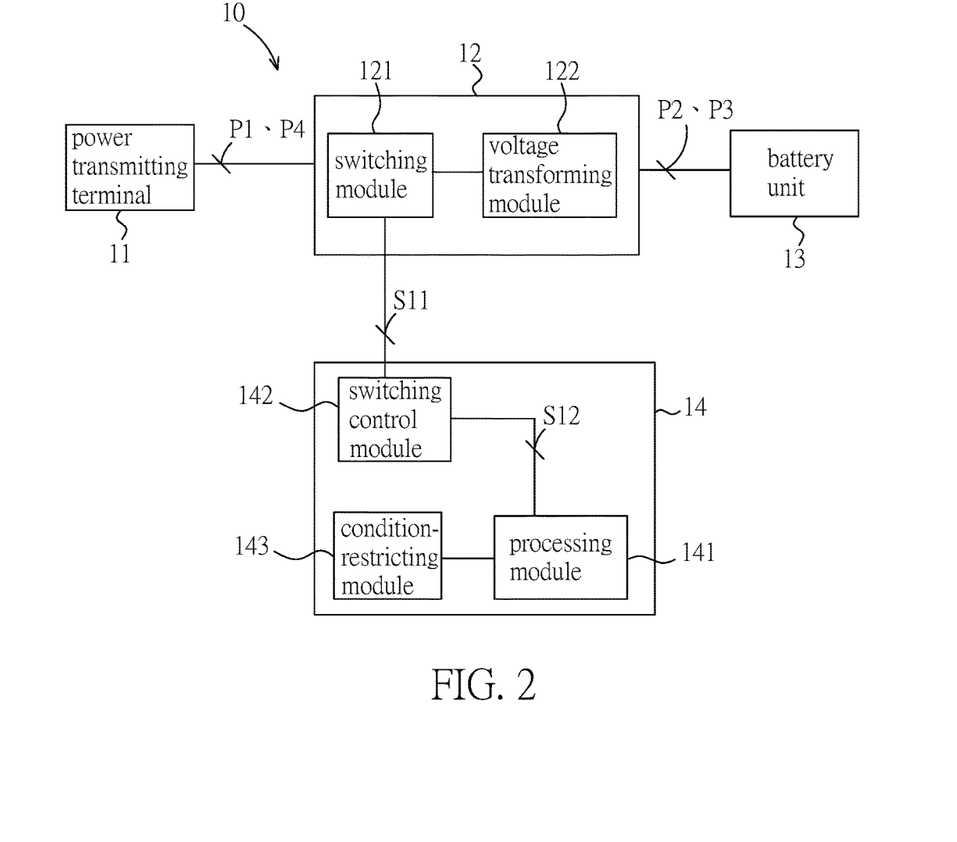
FIG. 2 is another schematic diagram of FIG. 1.

As shown in FIG. 2, the switched-mode DC-to-DC power converter 12 has a switching module 121 and a voltage transforming module 122. The switching module 121 consists of a plurality of switch elements comprising transistors. The module is controlled by switching control signal S11 and performs "turn on" and "turn off" actions respectively. The voltage transforming module 122 is mainly a voltage transforming circuit consisted of a transformer or magnetic elements. It may be a boost-type or buck-type transformer, as determined by the design of coil winding. It should be noted that, the composition of switched-mode DC-to-DC power converter 12 is not limited to said embodiment or as shown in the figure. Its objective is to achieve DC to DC power conversion.

The control unit 14 has a processing module 141, a switching control module 142 and a condition-restricting module 143. The condition-restricting module 143 stores at least one using restricting condition, including but not limited to restrictions over charging time, charging capacity, charging count, discharging power or charging capacity. The restriction for charging power may be, for example, charge inhibition (charger-off instruction). The using restricting condition can be inputted or set by the user in wired or wireless manner. If the charging capacity restriction is set at 0, it means that the batteries cannot be charged, so various restricting conditions can be matched or chosen in use. If the processing module 141 is a microprocessor, it can be electrically connected to the condition-restricting module 143, which outputs control signal S12 to the switching control module 142 according to using restricting conditions. The switching control module 142 then generates and outputs switching control signal S11 according to the control signal S12. Swappable battery pack set can be used in different external environments, different vehicles or can have different battery cells, which are all uncontrollable factors. Therefore, a predetermined performance restricting condition can be set according to the service life and range of safe use designed by the manufacturer, before the above-mentioned condition-restricting module leaves the factory, to ensure the service life and safety of the swappable battery pack set. In this embodiment, the predetermined performance restricting condition cannot be modified after leaving the factory so that the safety and service life of the swappable battery pack set can be ensured by the manufacturer. When detectors in the swappable battery pack set (e.g. temperature detector, current detector) reach the predetermined value, it then restricts the charging and discharging current of the pack set according to the predetermined performance restricting condition.

Figure 3:
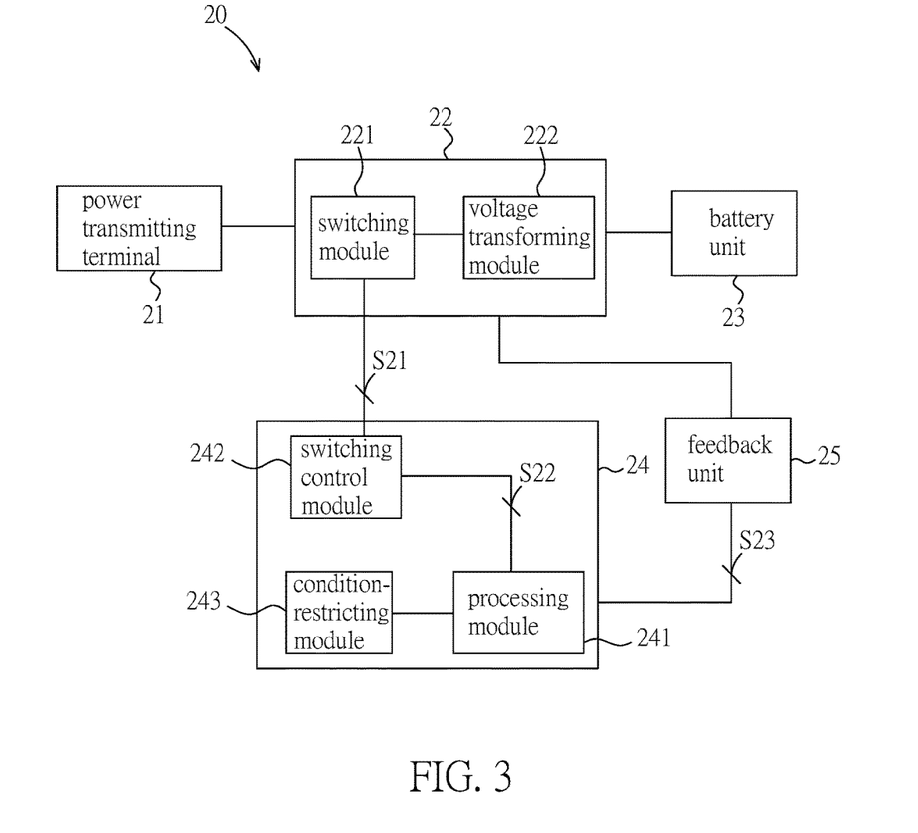
FIG. 3 is a schematic diagram of the second embodiment of a swappable battery pack set applied to an EV of the present invention.

As shown in FIG. 3, the swappable battery pack set 20 in the second embodiment comprises a power transmitting terminal 21, a switched-mode DC-to-DC power converter 22, a battery unit 23, a control unit 24 and a feedback unit 25. The power transmitting terminal 21, switched-mode DC-to-DC power converter 22, battery unit 23 and control unit 24 have the same composition and functions as the power transmitting terminal 11, switched-mode DC-to-DC power converter 12, battery unit 13 and control unit 14 in the first embodiment. Different from the first embodiment, in order to maximize the effect of the condition-restricting module 143, the second embodiment uses the feedback unit 25 together with a processing module 241, a switching control module 242 and a condition-restricting module 243 in the control unit 24.

The feedback unit 25 is electrically connected to the switched-mode DC-to-DC power converter 22 and captures the input or output characteristic parameters of the switched-mode DC-to-DC power converter 22. The input characteristic parameters include but are not limited to input current, input voltage and input power; the output characteristic parameters include but are not limited to output current, output voltage and output power. For example, if the rated capacity of swappable battery pack set is 100 Ah, and a using restricting condition inputted to the condition-restricting module 243 by the user is that the chargeable capacity is 100 Ah (1 C), meaning that, the pack set can run a 1 C charging Process to the swappable battery pack set 20 before the user changes the restricting condition. In this case, the feedback unit 25 can capture the output current value of the switched-mode DC-to-DC power converter 22, convert it into the feedback signal S23 that is identifiable by the processing module 241, and transmit the signal to the processing module 241. The processing module 241 then makes calculation based on the feedback signal S23, matching information with the clock and working storage (not shown in the figure), and obtain the current charging capacity If the charging capacity is lower than 1 C, the control signal S22 generated by the processing module 241 commands the control module 242 to generate switching control signal S21 to control the continuous operation of the switching module 221. If the charging capacity reaches 1 C, the control signal S22 generated by the processing module 241 commands the switching module 221 to stop operation, so that the swappable battery pack set 20 stop the charging action for the battery unit 23 actively. In this case, the control signal S22 or the switching control signal S21 that order the switching module 221 not to operate is an interrupt signal.

Figure 4:
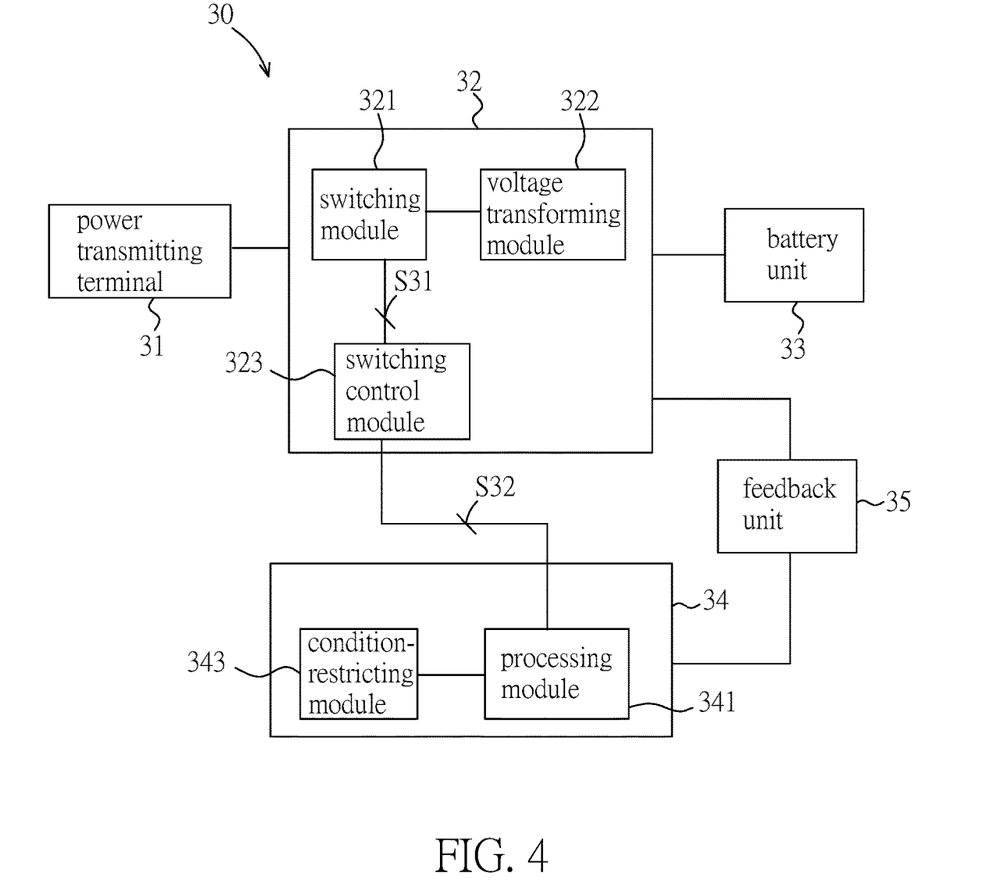
FIG. 4 is a schematic diagram of the third embodiment of a swappable battery pack set applied to an EV of the present invention.

As shown in FIG. 4, swappable battery pack set 30 in the third embodiment comprises a power transmitting terminal 31, a switched-mode DC-to-DC power converter 32, a battery unit 33, a control unit 23 and a feedback unit 35. Different from above embodiments, the switched-mode DC-to-DC power converter 32 is electrically connected to a switching module 321, a voltage transforming module 322 and a switching control module 323. The control unit 34 is electrically connected to a processing module 341 and a condition-restricting module 343. In this embodiment, the switching control module 323 receives a control signal S32 outputted by the processing module 341 of the control unit 34, and then generates a control signal S31. It should be noted that, positions of modules in the swappable battery pack set 30 may be adjusted according to actual needs (e.g. efficiency or costs), so no limitation is set.

Figure 5:
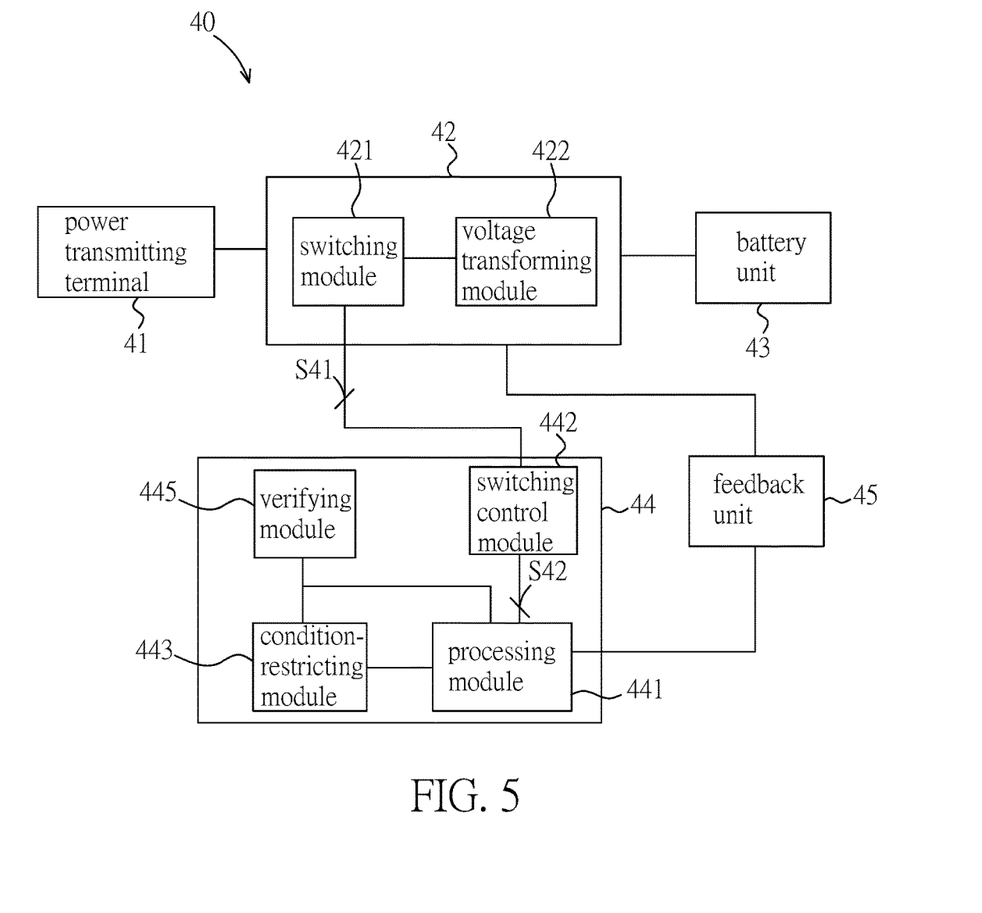
FIG. 5 is a schematic diagram of the fourth embodiment of a swappable battery pack set applied to an EV of the present invention.

To avoid easy changes to the restricting conditions of the condition-restricting module in the swappable battery pack set, software verification, hardware verification or software-hardware verification may be used to lock the change of swappable battery pack set. For example, the change can be locked by a key-structured mechanical device or hardware lock (e.g., digital restrictions management (DRM)), or software verification or a combination of software and hardware. FIG. 5 shows the fourth embodiment, the software verification method for the swappable battery pack set 40 for EVs.

As shown in FIG. 5, the swappable battery pack set 40 comprises a power transmitting terminal 41, a switched-mode DC-to-DC power converter 42, a battery unit 43, a control unit 44 and a feedback unit 45. Different from the above embodiments, the control unit 44 used in this embodiment has a processing module 441, a condition-restricting module 443, a switching control module 442 and a verifying module 445. The verifying module 445 is electrically connected to the processing module 441 and the condition-restricting module 443, mainly used as contents to change the condition-restricting module 443.

The verifying module 445 can be verified by account and password, fingerprint or touch gestures. Once the verifying module 445 is locked, the condition-restricting module 443 cannot be changed, until the user inputs corresponding verification conditions, in order to have control over the swappable battery pack set.

Figure 6:
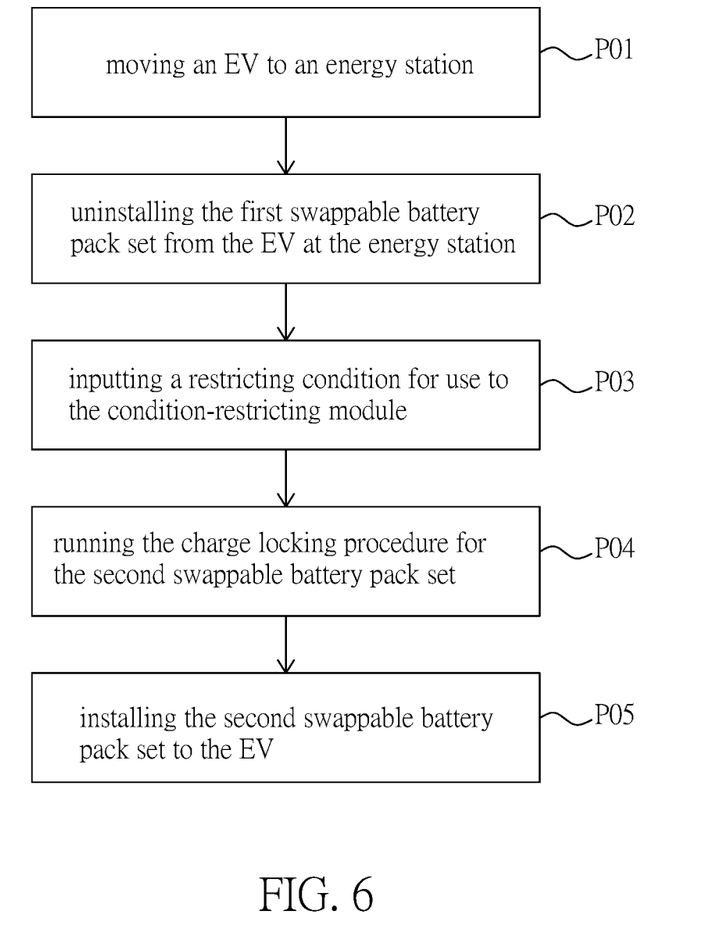
FIG. 6 is a flow chart of the fifth embodiment of a using method of a swappable battery pack set applied to an EV of the present invention.

As for the fifth to seventh embodiments of the present invention, as shown in FIG. 6, the fifth embodiment of this invention is the control method of the swappable battery pack set from the perspective of EVs in use, including Process P01 to Process P05.

Process P01 is to move an EV to a charging station. The EV has a main battery pack set and a first swappable battery pack set, and the size of the first swappable battery pack set is smaller than the main one.

Process P02 is to uninstall the first swappable battery pack set from the EV at a charging station. Operators at the charging station uninstall the first swappable battery pack set from the EV and transfer it to the storage zone for subsequent inspection, unlocking or charging.

Process P03 is that operators at a charging station input a using restricting condition to the condition-restricting module of a second swappable battery pack set according to user demand. The using restricting condition includes but is not limited to restrictions over charging capacity, discharging capacity, usage time or charging inhibition.

Process P04 is to run the charge locking Process for the second swappable battery pack set. Operators at the charging station conduct verification measures for the second swappable battery pack set, such as locking by account and password, fingerprint, touch gestures or keys, so that the user can not change the using restricting condition after the charge locking Process.

Process P05 is that operators at the charging station install the second swappable battery pack set to the EV and the user can use the second swappable battery pack set according to the using restricting condition. In this embodiment, the second swappable battery pack set, after being installed onto the EV, can transmit its using restricting condition to the control center of the EV, then supply electric power to the EV according to the using restricting condition. In other words, the using restricting condition, in addition to restrict the charge of swappable battery pack set, can also restrict its discharge.

Figure 7:
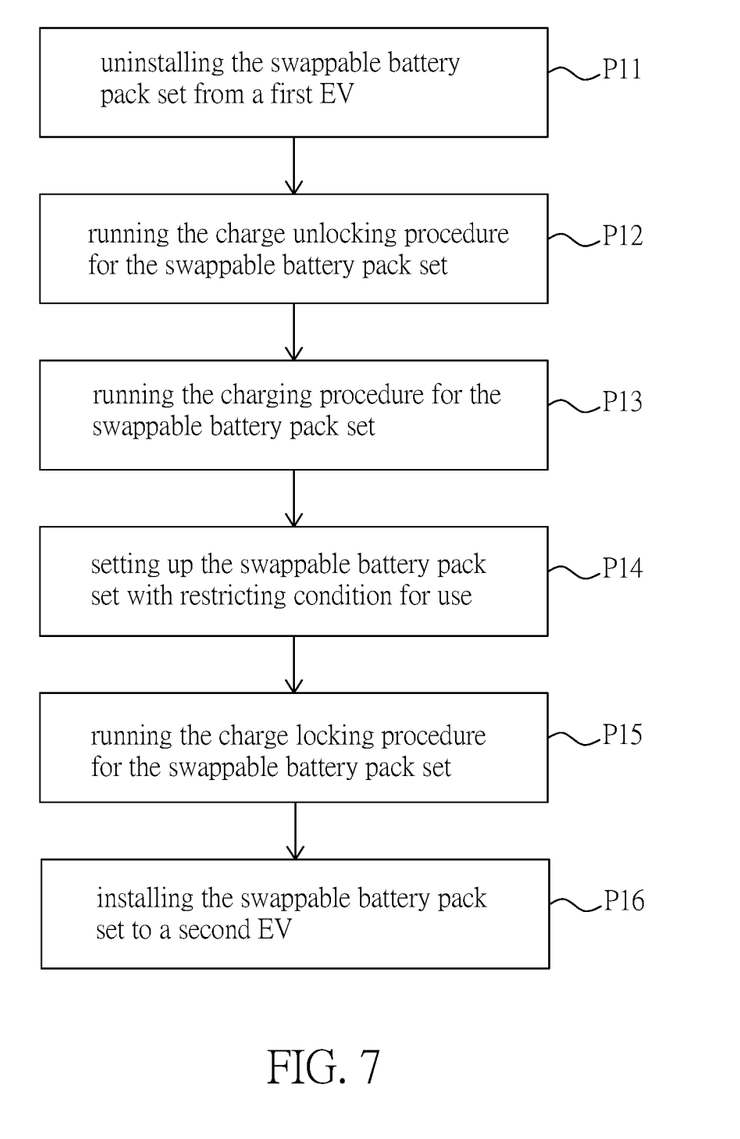
FIG. 7 is a flow chart of the sixth embodiment of a control method of a swappable battery pack set applied to an EV of the present invention.

As shown in FIG. 7, the sixth embodiment of the present invention is the control method of the swappable battery pack described from the perspective of swappable battery pack set in use, including Process P11 to Process P16.

Process P11 is to uninstall the swappable battery pack set from a first EV. Operators at the charging station uninstall the swappable battery pack set from the first EV.

Process P12 is that operators at the charging station run the charge unlocking Process for the swappable battery pack set. Operators at the charging station input verification conditions to the verifying module of the swappable battery pack set, so as to release the using restricting condition in the condition-restricting module.

Process P13 is to run the charging Process for the swappable battery pack set. Charging is conducted to the swappable battery pack set released from using restricting condition at the charging station.

Process P14 is to set up the fully charged swappable battery pack set with using restricting condition. Operators at the charging station input appropriate using restricting condition to the condition-restricting module of the swappable battery pack set according to user demand.

Process P15 is to run the charge locking Process for the swappable battery pack set. Operators at the charging station conduct verification measures for the swappable battery pack set, such as locking by account and password, fingerprint, touch gestures or keys, so that the user cannot change the using restricting condition after the charge locking Process.

Process P16 is that operators at the charging station install the swappable battery pack set to a second EV, and the user can use the swappable battery pack set according to the using restricting condition. In other embodiments, the first and second EVs can be the same one.

Figure 8:
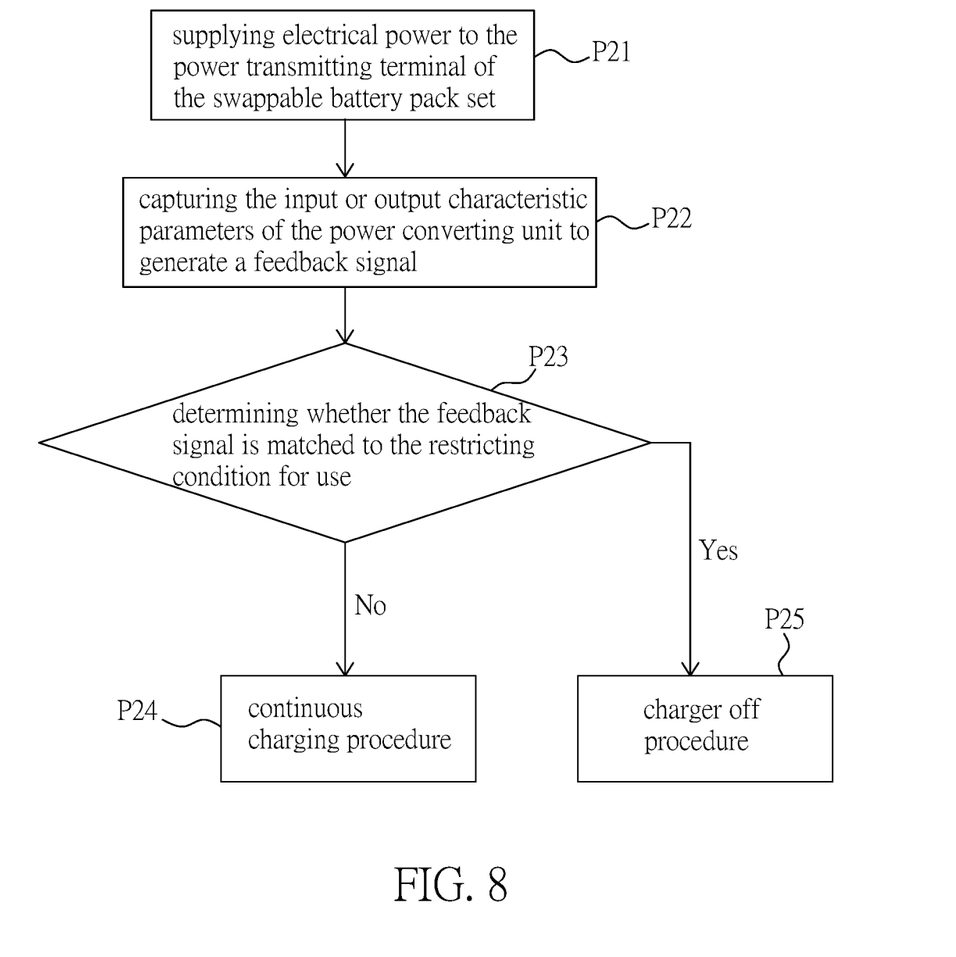
FIG. 8 is a flow chart of the seventh embodiment of a control method of a swappable battery pack set applied to an EV of the present invention.

As shown in FIG. 8, it is the control method of swappable battery pack described from the perspective of using the swappable battery pack set installed on the EV, including Process P21 to Process P25.

Process P21 is that the user supplies electrical power to the power transmitting terminal of the swappable battery pack set. The electrical power can be input to the power transmitting terminal of the swappable battery pack set through the connecting terminal predetermined in the EV, with no restrictions on the connection form.

Process P22 is that the feedback module of the swappable battery pack set captures the input or output characteristic parameters of the switched-mode DC-to-DC power converter, converts them to a feedback signal, and transmits them to the processing module of the control unit.

Process P23 is that the processing module compares the feedback signal with the using restricting condition to determine whether the two match with each other; if not, Process P24 will be executed, if so, Process P25 will be executed.

Process P24 is a continuous charging process, providing electrical power to the battery unit of the swappable battery pack set from external. Process P25 is a charger off process, stopping the operation of switched-mode DC-to-DC power converter so that no power can be transmitted to the battery unit.

As mentioned above, the control method of swappable battery pack set applied in EVs based on the present invention is a charge locking Process for swappable battery pack sets, namely, the charging of a swappable battery pack set run with the charge locking Process is controlled by the using restricting conditions in the condition-restricting module. The owner of the swappable battery pack set can inhibit the charging of the swappable battery pack set or set up restricting conditions for it, so that the user can only use the swappable battery pack set under the restricting conditions. As the authority of the restricting conditions and the charge unlocking or locking Process is held by the owner of the swappable battery pack set (e.g. the charging station), the owner can control the usage of the pack set. Charging stations can thus effectively avoid the unlimited and random use of swappable battery pack sets by users.

The above embodiments merely give the detailed technical contents of the present invention and inventive features thereof, and are not to limit the covered range of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A control method for a swappable battery pack set of electric vehicles (EVs), wherein each of the EVs has a main battery pack set and at least one swappable battery pack set, which is integrated with a switched-mode DC-to-DC power converter, simultaneously, comprising:
   uninstalling the swappable battery pack set from a first EV;
   executing a charge unlocking process to the swappable battery pack set to allow the change of a using restriction;
   charging the swappable battery pack set after executing the charge unlocking process;
   inputting the using restriction to a control unit of the swappable battery pack set;
   executing a charge locking process to the swappable battery pack set to disable the change of the using restriction; and
   installing the swappable battery pack set into a second EV, wherein the swappable battery pack set being discharged to the main battery pack set of the second EV through the switched-mode DC-to-DC power converter or charged from the second EV through the switched-mode DC-to-DC power converter according to the using restriction.

2. The control method defined in claim 1, wherein the using restriction comprises a charging time restriction, a charging power restriction or a charging count restriction.

3. The control method defined in claim 1, wherein when the swappable battery pack set is charged before the charge unlocking process, the processes comprise the following:
   transmitting a feedback signal to the control unit by a feedback unit;
   comparing the using restriction with the feedback signal by the control unit; and
   generating an interrupt signal by the control unit if the feedback signal satisfies the using restriction.

4. The control method defined in claim 3, wherein the interrupt signal is transmitted to a switched-mode DC-to-DC power converter.

5. The control method defined in claim 1, wherein when the swappable battery pack is charged before the charge unlocking Process, the processes comprise the following:
   comparing a clock signal with the using restriction by the control unit; and generating an interruptive signal by the control unit if the clock signal satisfies the using restriction.

6. The control method defined in claim 5, wherein the interrupt signal is transmitted to the switched-mode DC-to-DC power converter.

7. The control method defined in claim 1, wherein following actions are included after the swappable battery pack set is installed to the second EV, the processes comprise the following:

transmitting the using restriction to the EV from the swappable battery pack set; and providing an electrical power to the EV according to the using restriction by the swappable battery pack set.

8. The control method defined in claim 1, further comprises:

restricting a charging and discharging current through the switched-mode DC-to-DC power converter of the swappable battery pack set according to a predetermined performance restriction.

9. The control method defined in claim 8, wherein the swappable battery pack set is charged and discharged according to the predetermined performance-restriction, through the switched-mode DC-to-DC power converter integrated in the swappable battery pack set.

10. The control method defined in claim 1, wherein the charge locking process or the charging unlocking process is executed by a mechanical structure.

11. The control method defined in claim 1, wherein the charge locking process or the charging unlocking process is executed by the method of a software verification and/or a hardware verification.

* * * * *